United States Patent [19]
Kobryn et al.

[11] Patent Number: 5,482,212
[45] Date of Patent: Jan. 9, 1996

[54] VEHICLE WASHING MACHINE

[76] Inventors: Scott Kobryn, 209 Main Street West, Grimsby, Ontario, Canada, L3M 1S1; Donald Kobryn, 2284 Hollow Road North, Pelham, Ontario, Canada, L0S 1E6

[21] Appl. No.: 270,466

[22] Filed: Jul. 5, 1994

[51] Int. Cl.⁶ .............................. B05B 3/18; F16H 23/00
[52] U.S. Cl. ................. 239/227; 239/263.1; 239/263.3; 239/752; 74/86; 74/25
[58] Field of Search ............................ 239/750–752, 239/263.1–263.3, 264, 548, 556, 557, 227; 74/86, 55, 54, 25

[56] References Cited

U.S. PATENT DOCUMENTS

| | | | |
|---|---|---|---|
| 2,591,188 | 4/1952 | Nilsson | 239/263.2 X |
| 2,940,322 | 6/1960 | Uhing | 74/25 |
| 3,391,701 | 7/1968 | Richardson et al. | 239/751 X |
| 3,765,687 | 10/1973 | Weiss | 74/86 X |
| 4,158,845 | 6/1979 | Pinson | 74/86 X |
| 4,920,997 | 5/1990 | Vetter et al. | 239/752 X |

OTHER PUBLICATIONS

Photograph of Niagara Powerwash System First Installation in Toronto, Canada Dec. 1992.
Ryko Mfg. Co., Monarch II, Jun. 1992.
PDQ Mfg. Co., Laserwash 4000, 1990.
D & S Mfg., D & S 5000, Mar. 1992.
Mark VIII Equipment, Mark VII, 1992.
Walder Mfg. Co., Oasis 8520, 8700, 9100 (Date unknown).

Primary Examiner—Karen B. Merritt
Assistant Examiner—Lesley D. Morris
Attorney, Agent, or Firm—Bean, Kauffman & Spencer

[57] ABSTRACT

A vehicle washing machine is disclosed having an inverted U-shaped housing mounted for movement lengthwise of a stationary vehicle and return movement to an initial reference position during a vehicle washing cycle of the machine. The housing includes first mechanism comprising a vertically movable and rotatable pod depending from a bridge portion of the housing and having horizontally reciprocative nozzles mounted thereon for successively applying a cleaning solution and pressurized rinse water to a front end, top, and rear end of the vehicle, and second mechanism associated with opposite legs of the housing and having vertically reciprocative nozzles mounted thereon for successively applying a cleaning solution and pressurized rinse water to opposite sides of the vehicle. The machine includes a relay logic system for controlling the vehicle washing cycle.

11 Claims, 11 Drawing Sheets

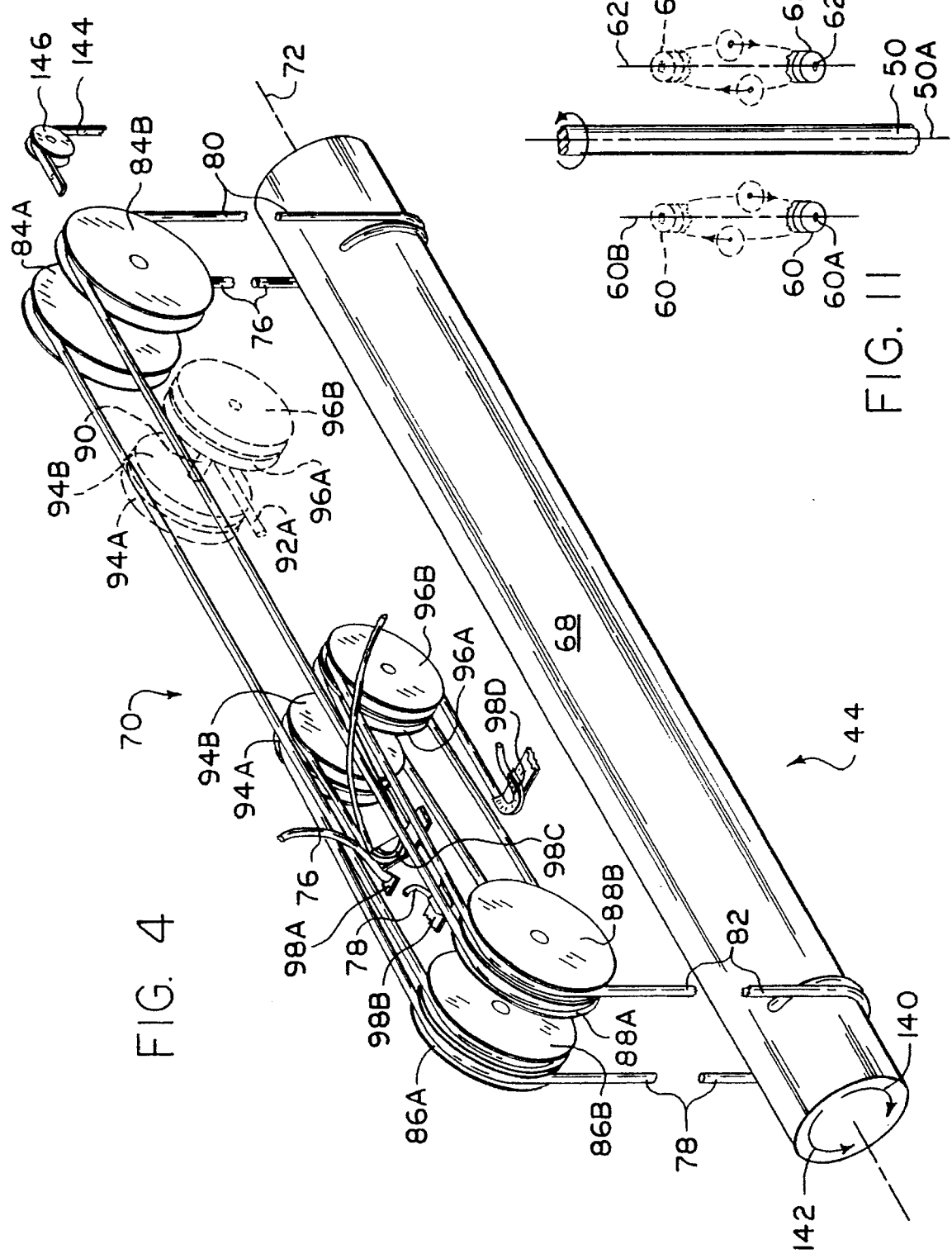

VEHICLE WASHING MACHINE

BACKGROUND OF THE INVENTION

The invention relates to vehicle washing machines of the type adapted to effect cleaning of the outer surfaces of the body of a vehicle without need for physically engaging such surfaces with surface abrading brushes, cloths, or the like.

Heretofore, vehicle washing machines of the type described have been designed to travel lengthwise of a stationary vehicle and, as an incident thereto, successively apply via nozzles a cleaning solution, e.g. soap, and pressurized rinse water to the surface of the vehicle. A primary drawback of prior machines is that they are not capable of effecting uniform removal of dirt and road film from the outer surfaces of vehicles within the relatively short operational or washing cycles typically required by a practical commercial installation. In this respect, certain prior machines are incapable of removing dirt and road film, while others employing nozzles emitting very high pressure rinse water jets capable of removing dirt and road film are mounted and/or arranged such that dirt and road film are removed in a non-uniform manner, thus creating "stripes" or a "zebra" effect at commercially acceptable machine operating speeds.

SUMMARY OF THE INVENTION

The present invention is directed towards an improved vehicle washing machine adapted to effect uniform removal of dirt and road film from outer surfaces of a vehicle under relatively high speed operating conditions.

The present machine includes an inverted generally U-shaped housing, wheel mounted for movement lengthwise of a stationary vehicle from and for return to an initial or reference position. The machine includes a plurality of pairs of cleaning solution and pressurized rinse water dispensing nozzles carried in a spaced apart relationship lengthwise within an elongated pod, which is in turn mounted for vertical movement and rotational movement through substantially 180° relative to the housing, whereby to follow a path of travel relative to a vehicle, as an incident to movement of the housing lengthwise of such vehicle, serving to first apply cleaning solution in succession to the front end, top and rear of the vehicle, and then to apply rinse water in succession to the rear end, top and front end of the vehicle.

The machine further includes a plurality of pairs of cleaning solution and pressurized rinse water dispensing nozzles spaced vertically of each leg or side of the housing for successively directing jets of cleaning solution and rinse water against the sides of the vehicle incident to movement of the housing lengthwise of the vehicle.

The nozzles used for dispensing pressurized rinse water are preferably "zero degree" nozzles characterized as having essentially a zero angle of divergence of the jet or stream of liquid issuing or discharged from the discharge orifice of the nozzle, and are mounted for high speed, swinging movement to produce fan-like discharge patterns directed transversely of the vehicle. The minimum angular divergence of the rinse water nozzle jets and their manner of support allow for essentially complete removal of road film from the outer surface of the vehicle being washed.

BRIEF DESCRIPTION OF THE DRAWINGS

The nature and mode of operation of the present invention will now be more fully described in the following detailed description taken with the accompanying drawings wherein:

FIG. 4 is a perspective view of the pod mounting mechanism;

FIG. 11 is a view illustrating the paths of travel of a pair of nozzles incident to a full rotation of a drive shaft;

DETAILED DESCRIPTION

Figure 1:
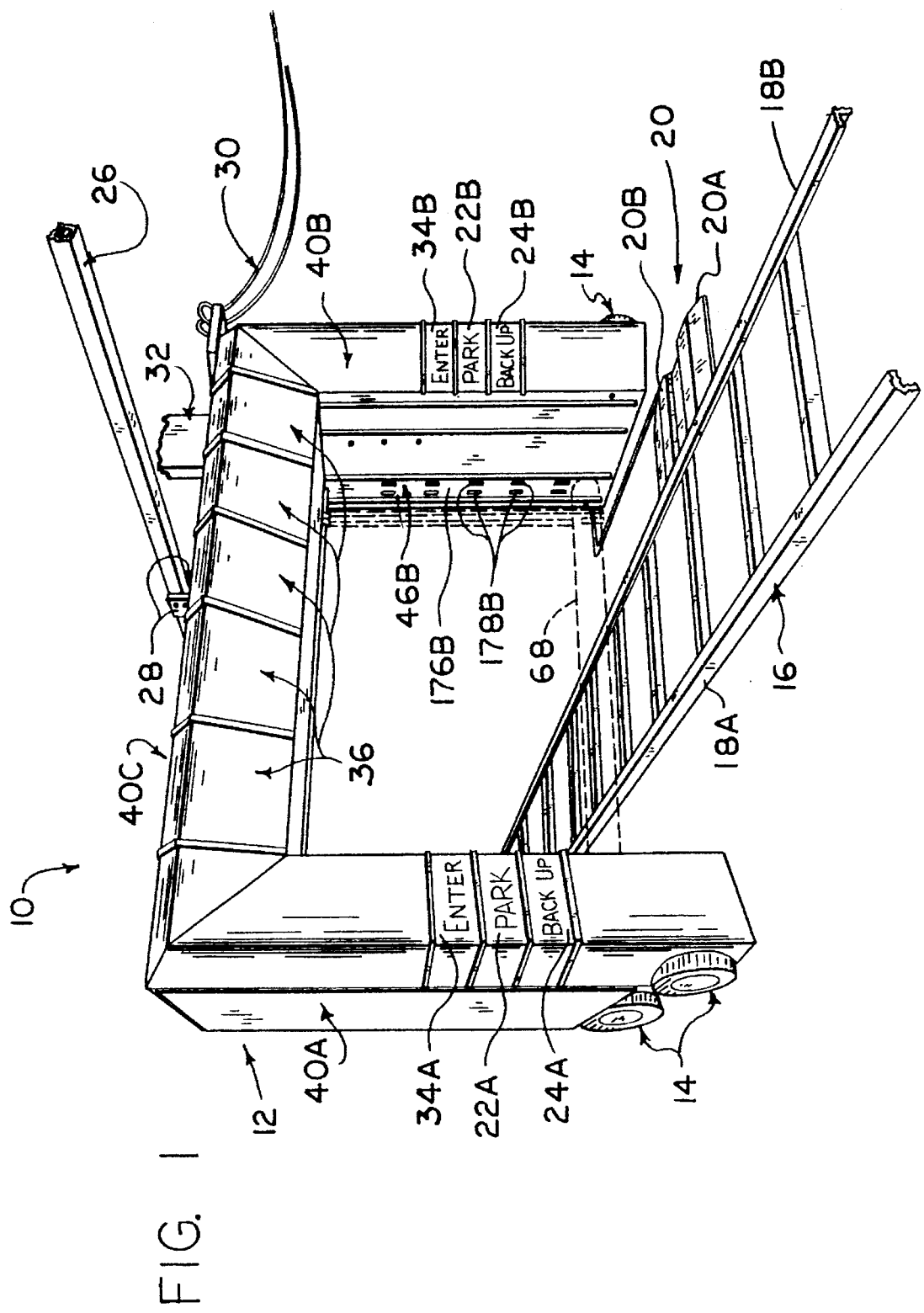
FIG. 1 is a front perspective view of a vehicle washing machine of the present invention.

Reference is first made to FIG. 1, wherein a vehicle washing machine formed in accordance with the present invention is shown generally as 10 and as including a housing 12 mounted on solid rubber wheels or tires 14 for movement relative to a vehicle to be washed, not shown, from and for return to an illustrated initial or reference position suitably defined, as by a proximity switch, not shown; a floor mounted vehicle guide trackway 16 having a pair of parallel side rails 18A,18B arranged for engagement by inner side walls of the tires of a vehicle for purposes of properly positioning the vehicle transversely relative to the housing; a vehicle right front tire position sensing device 20 having front and rear ramps 20A and 20B and switches, not shown, for indicating to the driver of the vehicle via visual displays 22A and 22B that the vehicle right front tire, not shown, is properly positioned between the ramps, and the vehicle is thereby properly parked with reference to the housing for vehicle washing purposes, or via displays 24A and 24B that the vehicle has proceeded beyond its proper parked position; a suitably suspended guide rail 26 slidably engaged by housing mounted follower brackets 28 for purposes of guiding the housing during movement thereof lengthwise of the vehicle; a group of flexible electrical and pressurized air supply conduits 30 for connecting the housing to a stationary supply; and a stationary liquid supply or dispensing means 32 for supplying rinse water, cleaning solution and other desired liquid, such as liquid wax, to the housing whenever the latter is in its initial or reference position.

In the absence of a vehicle arranged in engagement with tire position sensing device 20, housing 12 remains in its initial or reference position and an approaching driver is advised, via visual indicators 34A and 34B that machine 10 is in condition to receive a vehicle for washing purposes. Additional visual indicators, 36 shown in FIGS. 1 and 15b, may be provided for purposes of advising a driver of the benefits offered to a user of machine 10. Priming of machine 10 for operation may be achieved for instance by the deposit of money, such as a bill in a bill acceptor 38, shown only in FIG. 15a and located at a remote entry station, not shown. Associated with bill acceptor 38 may be a manually operated car wash button 38A and a wax selection button 38B, also shown only in FIG. 15a.

Figure 2:
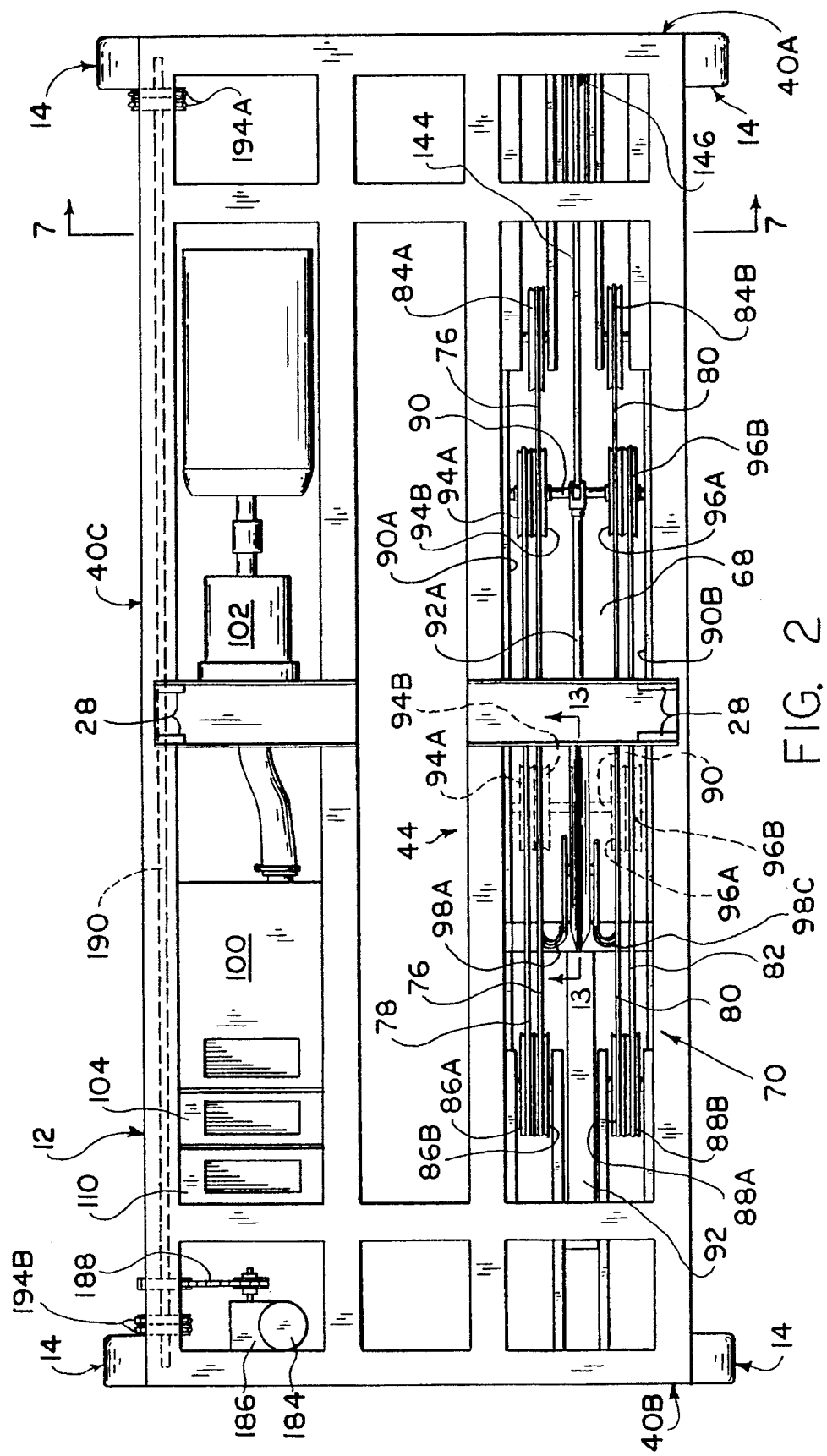
FIG. 2 is a top plan view of the housing of the machine.
Figure 3:
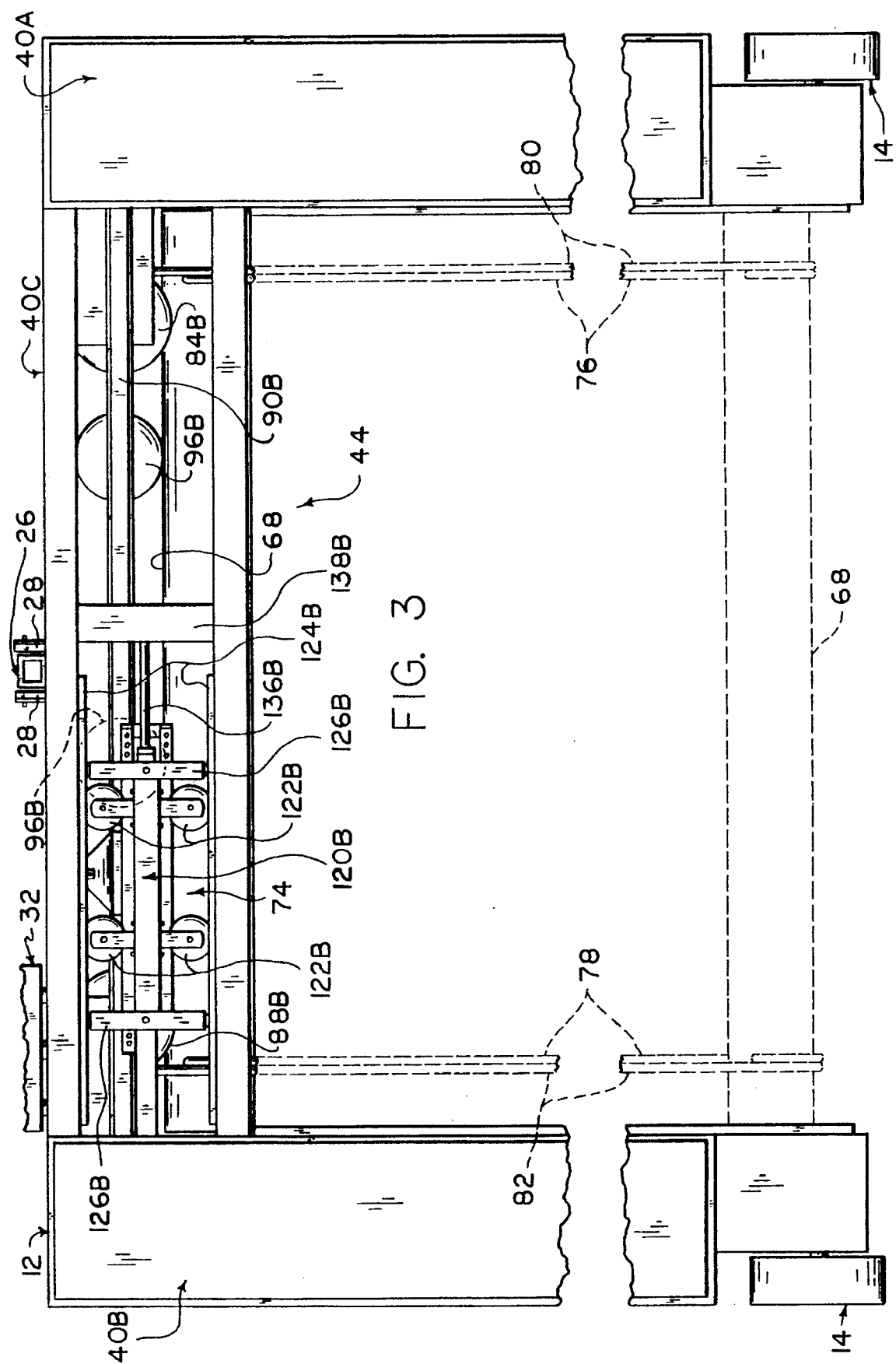
FIG. 3 is a fragmentary rear elevational view of the machine.
Figure 7:
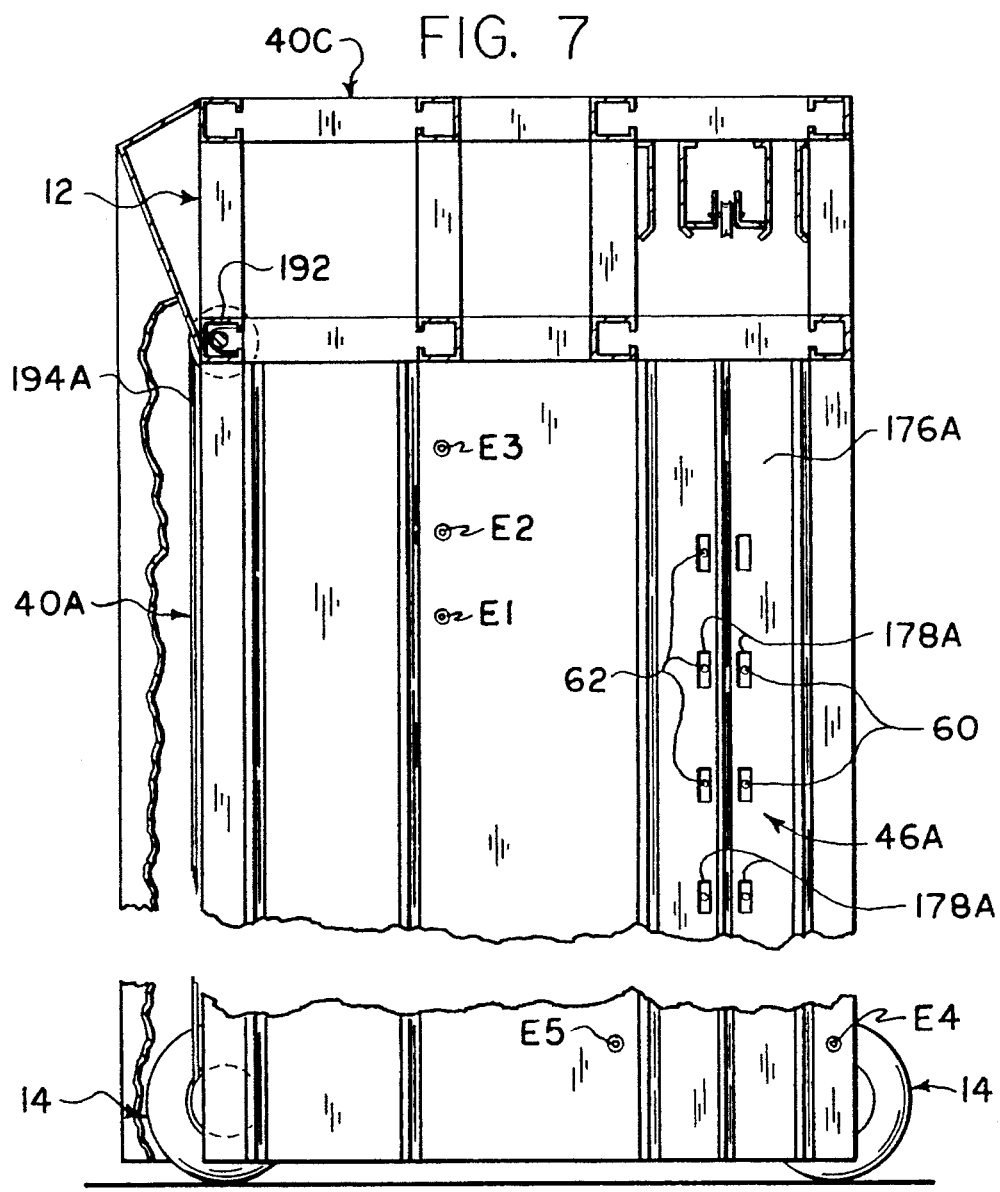
FIG. 7 is a fragmentary, sectional view taken generally along the line 7—7 in FIG. 2.

Housing 12 is shown as being of inverted U-shaped construction having upstanding left and right leg portions 40A and 40B, as viewed in FIG. 1, and an upper or bridging portion 40C. Portions are fabricated by a plurality of interconnected square cross-section metal channels covered by sheet metal panels, as best shown in FIGS. 2, 3 and 7.

In accordance with the present invention, a suitable cleaning solution, such as liquid soap, and pressurized rinse water are intended to be successively applied to the outer surfaces of the body of a vehicle, during each operational cycle of machine 10. In a presently preferred form of the invention, three separate application mechanisms are provided and include a first means 44 associated with housing upper portion 40C and intended to apply liquids to opposite ends and the top of a vehicle, and a second means having a pair of mirror image portions 46A and 46B associated with housing legs 40A and 40B, respectively, and intended to apply liquids to opposite sides of a vehicle. Preferably, second means portions 46A and 46B are arranged in a facing horizontally aligned relationship and disposed in vertical alignment with first means 44.

Figure 8:
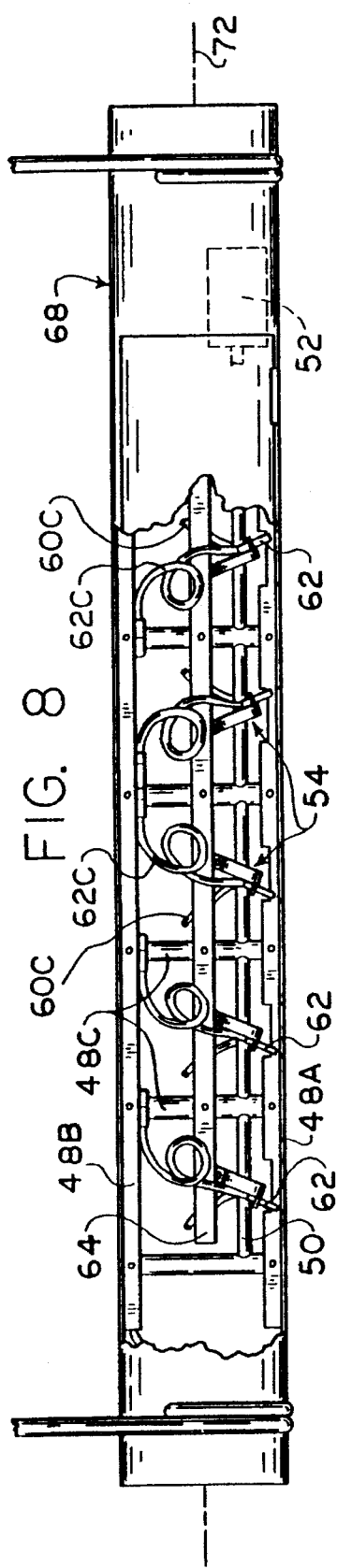
FIG. 8 is a fragmentary view of the pod.
Figure 9:
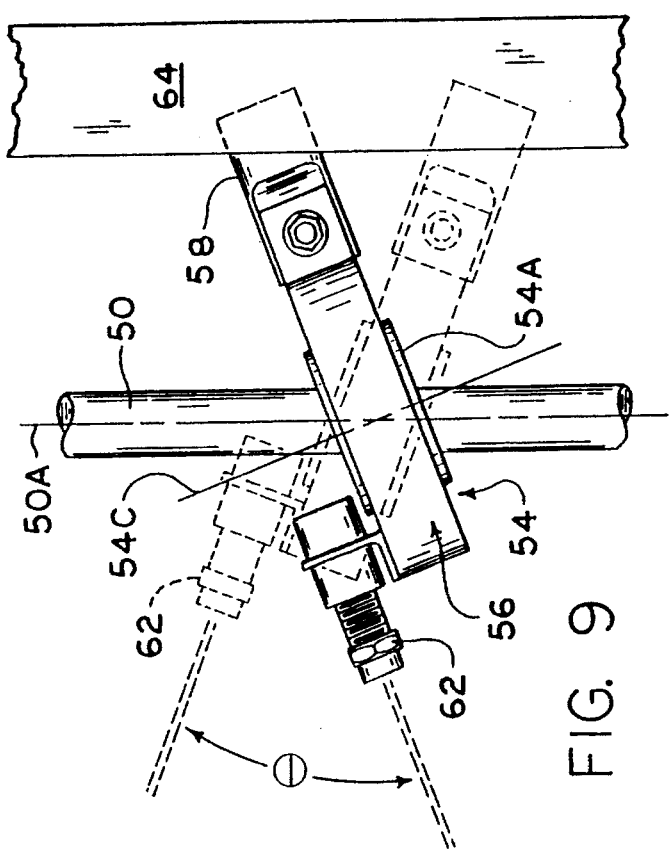
FIG. 9 is a fragmentary side view of a nozzle mounting and drive arrangement.

Each of means 44, 46A and 46B has in common a drive and support mechanism for applying liquids in a fan-like spray pattern, which is shown in FIGS. 8–10 and 14 as including a framework having first and second parallel members 48A and 48B joined by transversely extending cross members 48C provided with aligned openings for rotatably receiving a drive shaft 50 driven for rotation about its axis 50A relative to the framework by an electric motor 52; a plurality of bearings 54 having inner and outer bearing parts 54A and 54B journalled for relative rotational movement about a bearing axis 54C; a plurality of mounting brackets 56, which are arranged to encircle and be fixed, as by being clamped, one to each of bearing outer parts 54B and include followers 58 arranged to project radially of bearing axis 54C; nozzles typically mounted one pair on each of the mounting brackets and including a first nozzle 60 for dispensing cleaning solution and a second nozzle 62 for dispensing rinse water; and guide means, such as may be defined by a pair of parallel plates 64 and 64, which are fixed to cross members 48C intermediate and parallel to drive shaft 50 and second member 48B and spaced to freely rotatably and slidably receive the generally cylindrically shaped outer ends of followers 58. Bearing inner parts 54A are formed with through openings 66 sized to slidably receive drive shaft 50 and suitable lock means, such as set screws, not shown, for keying the inner parts for rotation with the drive shaft at points spaced essentially uniformly axially thereof. Openings 66 are arranged such that bearing axes 54C reside at a common angle relative to drive shaft axis 50A, as indicated in FIG. 9.

Figure 10:
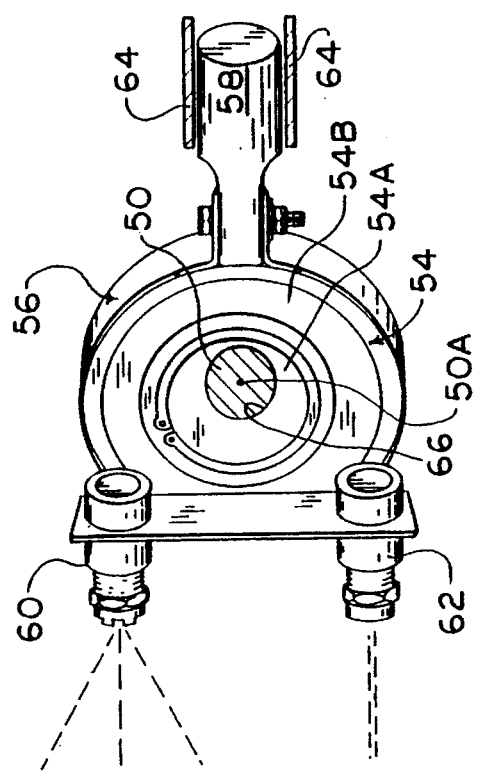
FIG. 10 is an end sectional view of the arrangement of FIG. 9.

As is apparent from FIG. 10, plates 64 cooperate with followers 58 to constrain outer bearing part 54B from rotation with inner bearing part 54A about drive shaft axis 50A.

Nozzles 60 and 62 are supported by mounting brackets 56 such that they are essentially parallel, arranged to straddle framework first member 48A, and disposed on opposite sides of and equidistant relative to bearing axis 54C. During each full rotation of drive shaft 50, nozzles 60 and 62 are forced to swing relative to the drive shaft back and forth through an angle θ, which is shown in FIG. 9 and is preferably on the order of about 45° to produce fan-like spray or discharge patterns. As an incident to this swinging movement of nozzles 60 and 62, their associated discharge orifices 60A and 62A, when viewed from the left of FIG. 9, are forced to move back and forth along somewhat oval paths of travel extending away from and for return to the full line positions of the nozzles as shown in FIG. 11. As the spacing of nozzles 60 and 62 relative to their associated bearing axes 54C is reduced, the paths followed by discharge orifices 60A and 62A are progressively flattened to lie closer and closer adjacent to a pair of parallel planes, which are shown only in FIG. 11 at 60B and 62B as extending through the illustrated opposite end positions of orifices 60A and 62A and arranged parallel to drive shaft 50. If desired, nozzles 60 could be removed from brackets 56 and arranged at fixed positions spaced lengthwise of drive shaft 50 in which case nozzles 62 could be arranged such that orifices 62A would move wholly within common plane 62B within which would lie drive shaft axis 50A. However, it is desirable to mount nozzles 60 for movement with nozzles 62 in the manner illustrated, since this allows for better distribution of cleaning solution under less discharge pressure than would otherwise be required.

Further, it is preferable that first nozzles 60 produce a generally conical or divergent discharge of cleaning solution, and that second nozzles 62 are "zero degree" nozzles characterized as allowing a minimum divergence of streams or jets of rinse water issuing therefrom. It is desirable that rinse water issuing from nozzles be directed against vehicle surfaces with sufficient force to provide for removal of dirt and road film, but at levels below that at which damage to paint will occur. High pressure coupled with a drive shaft rotational speed of about 250 rpm has been found sufficient to achieve commercially acceptable cleaning of vehicle surfaces.

Figure 5A:
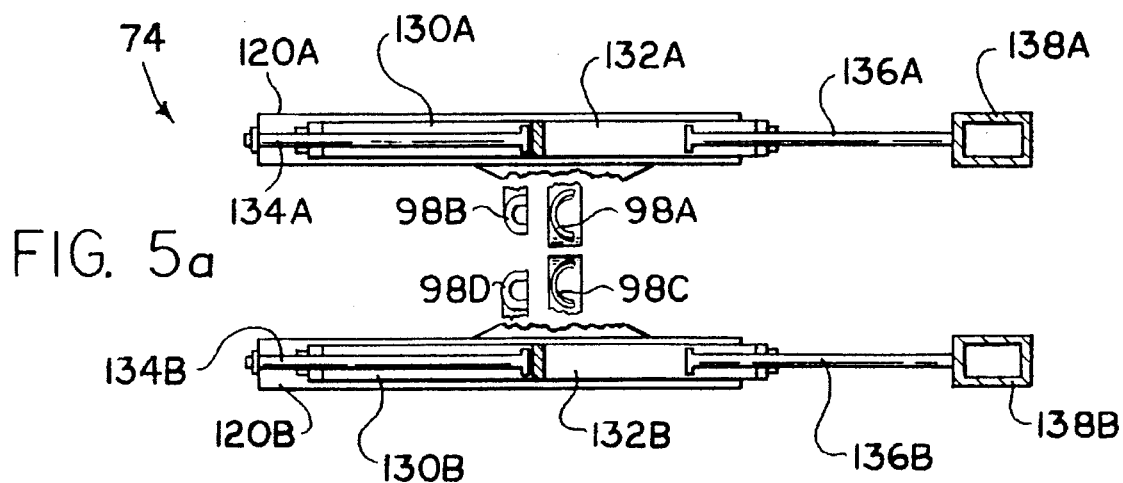
FIGS. 5a–5c are views illustrating operation of the means for effecting rotational movement of the pod.
Figure 5B:
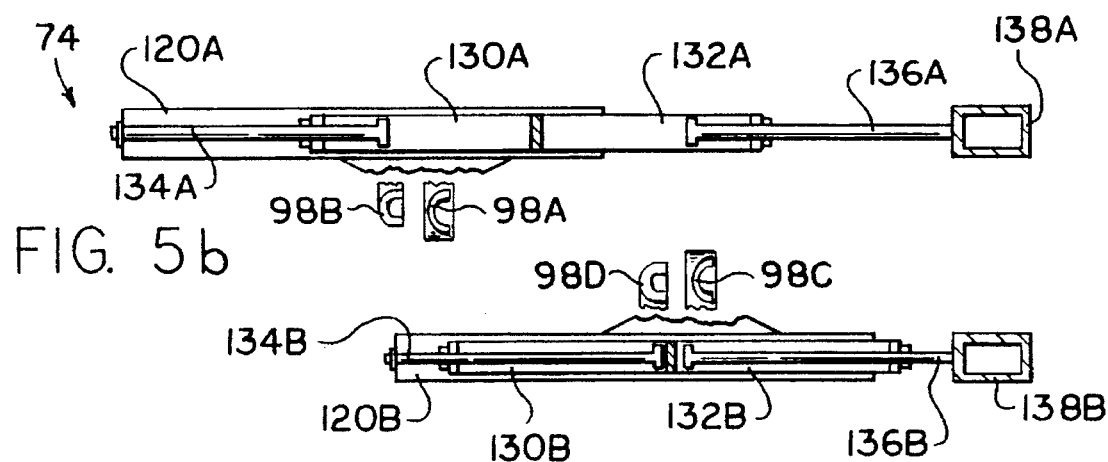
Figure 5C:
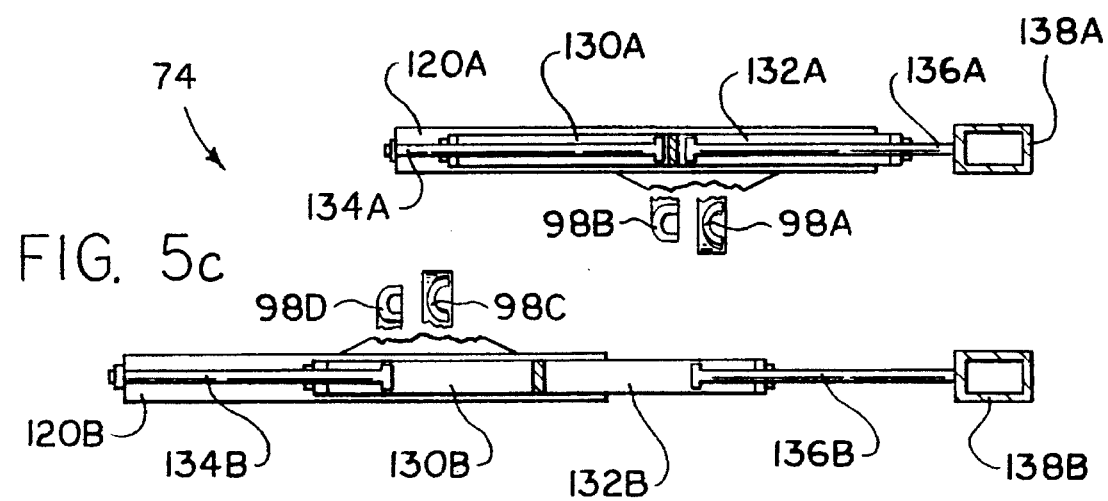
Figure 6A:
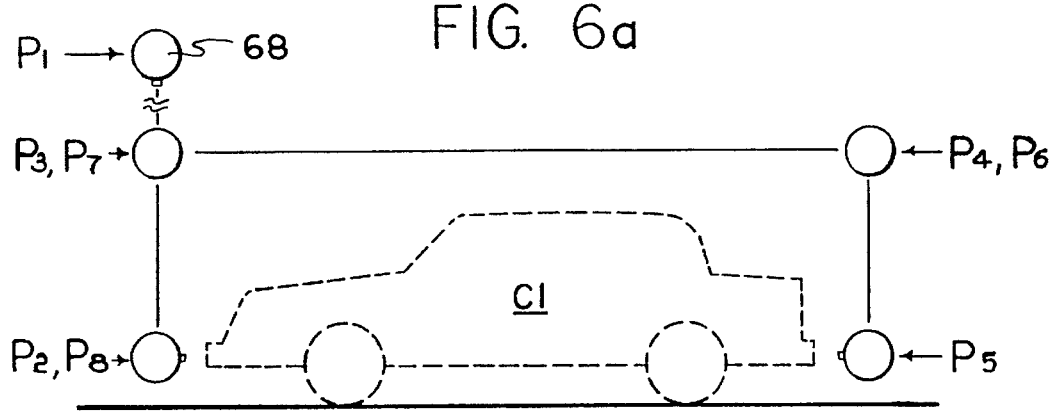
FIGS. 6a–6d are diagrammatic views showing varied movements of the pod dependent on the size of a vehicle being washed.

Now referring to FIGS. 2, 3, 4 and 8, it will be understood that the drive and support mechanism of first means 44 is arranged within a generally cylindrical pod 68, which is supported in turn by a lift/lowering means 70 best shown in FIG. 4 for vertical movement between an uppermost or storage position shown in full line in FIG. 3 and as for example at $P_1$ in FIG. 6a and a lowermost use position shown in broken line in FIG. 3 and for example at $P_2$, $P_5$ and $P_8$ in FIG. 6a, and for rotation about a lengthwise extending axis 72 through substantially 180° by rotation means 74 best shown in FIGS. 3, 5a–5c and 13.

Pod 68 is provided with pairs of surface piercing slot openings, not shown, which are elongated in a direction extending lengthwise of the pod and arranged for alignment with the pairs of its nozzles 60 and 62, and with lengthwise extending and internally arranged cleaning solution distribution and rinse water distribution manifolds, not shown, connected to nozzles 60 and 62 by flexible conduits 60C and 62C, respectively.

Lift/lowering means 70 is best shown in FIG. 4, as including first and second rinse water supply flexible conduits 76 and 78, respectively, connected to opposite ends of the rinse water distribution manifold of pod 68 through its first and second ends; a third cleaning solution supply flexible conduit 80 connected to an end of the cleaning solution distribution manifold of the pod through its first end; a fourth flexible electricity supply conduit 82 connected to electric motor 52 through the second end of the pod; a first pair of rotatable pulleys 84A and 84B journalled on housing upper portion 40C above the first end of the pod; a second pair of rotatable pulleys 86A and 86B and a third pair of rotatable pulleys 88A and 88B journalled in an aligned relationship on the housing upper portion above the second end of the pod; carrier means including a journal carrier 90, which has its opposite ends supported by housing upper portion mounted guide tracks 90A and 90B for horizontal movement lengthwise of the pod under the control of a pneumatic cylinder 92 whose piston rod 92A has its free end connected to the journal carrier; a fourth pair of rotatable pulleys 94A and 94B supported on one end of journal carrier 90 in substantial alignment with first pulley 84A and second pulleys 86A and 86B in a direction extending lengthwise of the pod; a fifth pair of rotatable pulleys 96A and 96B supported by an opposite end of the journal carrier in substantial alignment with first pulley 84B and third pulleys 88A and 88B in a direction extending lengthwise of the pod; and first, second, third and fourth anchors 98A, 98B, 98C and 98D for positioning conduits 76, 78, 80 and 82, respectively, relative to the housing upper portion remotely of the points at which these conduits are connected into the pod.

By again referring to FIG. 4, it will be noted that first conduit 76 extends between the first end of pod 68 and first anchor 98A in succession upwardly over first pulley 84A, downwardly around second pulley 86B and upwardly around fourth pulley 94B. Second conduit 78 extends between the second end of pod 68 and second anchor 98B in succession upwardly over second pulley 86A and downwardly around fourth pulley 94A. Third conduit 80 extends between the first end of the pod and third anchor 98C in succession upwardly over first pulley 84B, downwardly around third pulley 88A and upwardly around fifth pulley 96A. Fourth conduit 82 extends between the second end of the pod and fourth anchor 98D in succession upwardly over third pulley 88B and downwardly around fifth pulley 96B. Anchors 98A–98D may be variously defined, but preferably are friction retainers having convergent friction surfaces defining a trough of V-shaped cross-section, which is curved lengthwise thereof through approximately 180°, whereby when a conduit laid within the trough is subject to tension due to the weight of pod 68, such conduit is drawn into the trough and frictionally retained in place therewithin. As best shown in FIGS. 2–4, the diameters of fourth pulleys 94A and 94B are smaller than first pulley 84A and second pulleys 86A and 86B, and the diameters of fifth pulleys 96A and 96B are smaller than first pulley 84B and third pulleys 88A and 88B, thereby to avoid frictional rubbing contact of the upper runs of conduits 76 and 80 with pulleys 94B and 96A.

As will be apparent from viewing FIGS. 2–4, the vertical position of pod 68 is determined by the horizontal position of journal carrier 90 and thus fourth pulleys 94A and 94B and fifth pulleys 96A and 96B. Thus, when piston 92A is extended to move journal carrier 90 towards first pulleys 84A and 84B into a first limiting position shown in full line in FIG. 2 and broken line in FIG. 4, the lengths of the vertically extending runs of conduits 76, 78, 80 and 82 are reduced to a minimum such that pod 68 is lifted into its uppermost or storage position shown in full line in FIG. 3. On the other hand, when piston 92A is retracted to move journal carrier 90 away from the first pulleys into a second limiting position shown in broken line in FIG. 2, the lengths of the vertically extending runs of the conduits is increased to a maximum such that pod 68 is lowered into its lowermost use position shown in broken line in FIG. 3.

The ends of first conduit 76 and second conduit 78 disposed remotely of pod 68 are connected into a suitable manifold, not shown, arranged to receive rinse water from water reservoir 100 via a high pressure pump 102. The end of third conduit 80 disposed remotely of pod 68 is connected into a suitable manifold, not shown, arranged to receive cleaning solution from a cleaning solution reservoir 104 via a low pressure pump, not shown. The end of fourth conduit 82 disposed remotely of pod 68 is connected into a relay logic system 106 of the machine, shown in FIG. 15a, and cooperates with electric motor 52 arranged within the pod to define horizontal reciprocator drive 108. As previously indicated electric power, as well as air under pressure is initially supplied to the machine by the permanent connection of conduits 30.

Figure 15A:
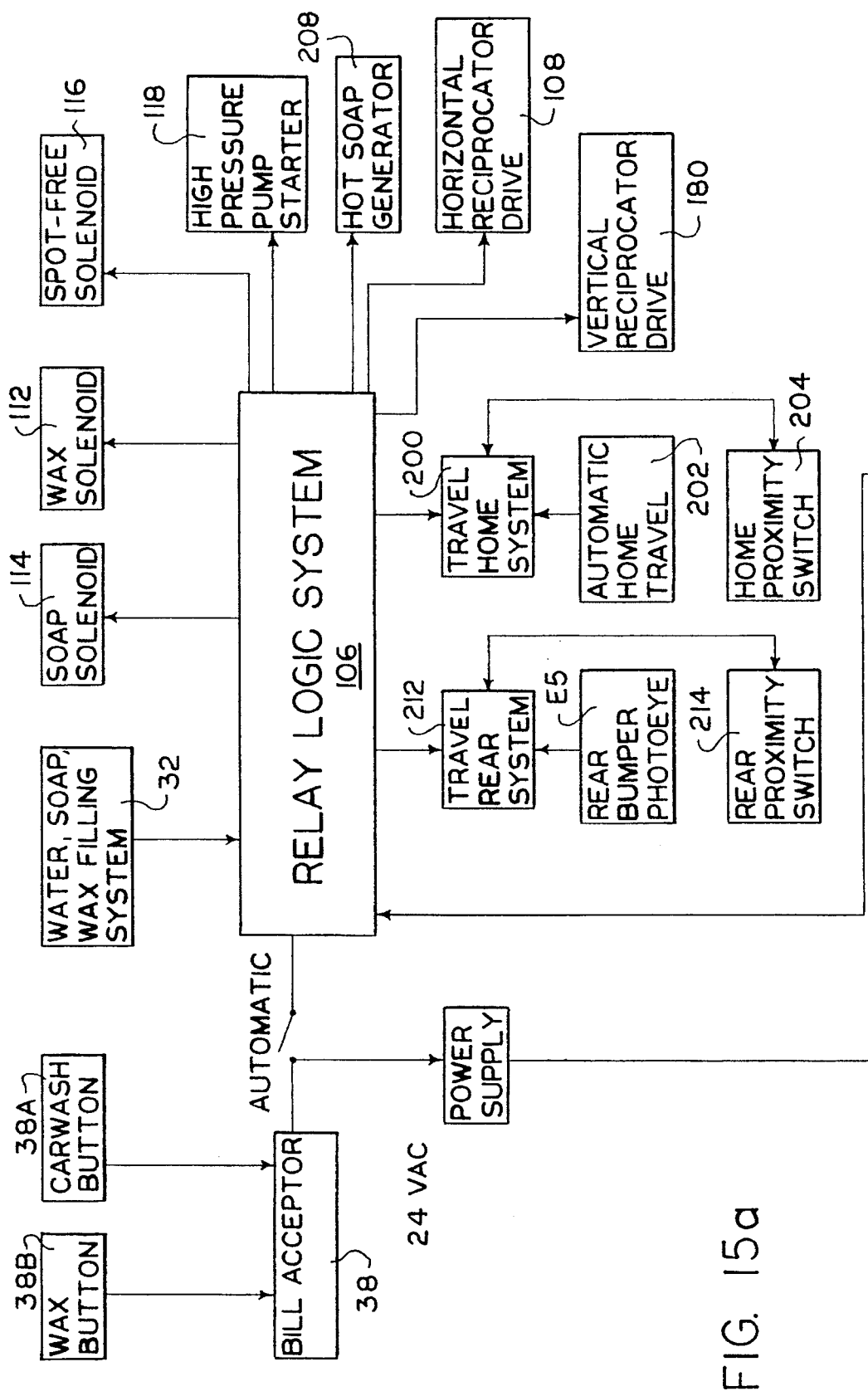
FIGS. 15a and 15b are diagrammatic views illustrating information display elements and control elements connected to a relay logic system.

A wax reservoir 110 is shown in FIG. 2 as being arranged with reservoirs 100 and 104 for receipt of liquids from dispensing means 32 when housing 12 is in its initial position. A conduit, not shown, having a valve controlled by solenoid 112 shown in FIG. 15a is provided for supplying wax from reservoir 110 to the rinse water when desired. A soap solenoid 114 and a spot-free solenoid 116, shown in FIG. 15a, are connected to relay logic system 106 and operate valves, not shown, for respectively controlling the flow of cleaning solution through conduit 80 and the flow of rinse water through conduits 76 and 78. A starter 118 for high pressure pump 102 is also connected to relay logic system 106.

Figure 13:
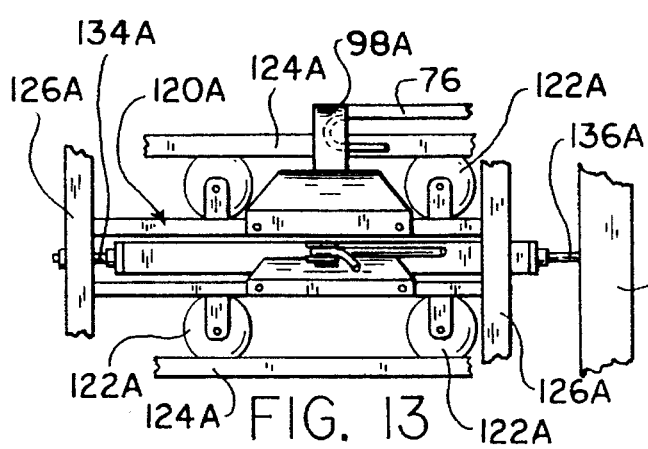
FIG. 13 is a sectional view taken generally along the line 13—13 in FIG. 2, when the means for effecting rotational movement of the pod is in its condition shown in FIG. 5c.

Rotation means 74 is shown in FIGS. 3 and 13 as including a pair of carriages 120A and 120B independently mounted by support rollers 122A and 122B for movement lengthwise of pod 58 by pairs of housing upper portion mounted and vertically spaced, U-shaped guide tracks 124A and 124B, wherein the upper and lower ends of carriage mounted posts 126A and 126B carry vertically axially aligned pairs of guide rollers, not shown, arranged to engage with the parallel legs of the guide tracks to retain the carriages in vertically disposed parallel relationship incident to movement thereof along the guide tracks. Carriage 120A mounts anchors 98A and 98B, as a first pair of anchors, and has attached thereto a pair of end-to-end connected and axially aligned pneumatic cylinders 130A and 132A. A free end of a piston rod 134A of cylinder 130A is fixed to carriage 120A and a free end of a piston rod 136A of cylinder 132A is fixed to an upstanding center post 138A forming part of housing upper portion 40C. Carriage 120B mounts anchors 98C and 98D and has attached thereto elements similar to those of carriage 120A, but designated by the letter "B".

In a first position of carriers 120A and 120B and thus anchors 98A,98B and anchors 98C,98D, respectively, which is achieved by simultaneous extensions of pistons 136A and 136B and simultaneous retractions of pistons 130A and 130B, the first and second pairs of anchors are essentially equally spaced a given distance from pulleys 84A and 84B as shown in FIG. 3 and FIG. 5a, with the result that pod 68 is rotatably orientated as shown in FIGS. 4 and 8 to position its nozzles 60 and 62 to point vertically downwardly.

The carriers and anchors can be moved into a second position shown in FIG. 5b, wherein the first and second pairs of anchors are respectively spaced from pulleys 84A and 84B through a distance which is greater than and a distance which is less than the given distance by the simultaneous extensions of pistons 134A and 136A and the simultaneous retractions of pistons 134B and 136B. As an incident to movement of the pairs of anchors into this second position, first and second conduits 76 and 78 are retracted and third and fourth conduits 80 and 82 are extended with the result that pod 68 is forced to rotate through 90° from its initial rotational position, as indicated by arrow 140 in FIG. 4, into a second rotational position thereof where its nozzles 60 and 62 are directed essentially horizontally in a first direction extending towards a front or entrance end of machine housing 12, that is, directed to point towards the left as viewed in FIG. 7.

The carriers and anchors can be moved into a third position shown in FIG. 5c, wherein the first and second pairs of anchors are respectively spaced from pulleys 84A and 84B through a distance which is less than and a distance which is greater than the given distance by the simultaneous retractions of pistons 134A and 136A and the simultaneous extensions of pistons 134B and 136B. As an incident to movement of the pairs of anchors into this third position, first and second conduits 76 and 78 are extended and third and fourth conduits 80 and 82 are retracted, with the result that pod 68 is forced to rotate through 90° from its initial rotational position, as indicated by arrow 142 in FIG. 4, into a third rotational position thereof where its nozzles 60 and 62 are directed essentially horizontally in a second direction extending towards the rear or exit end of machine housing 12, that is, directed to point towards the right as viewed in FIG. 7. Thus, the angular displacement of pod 68 between its second and third rotational positions may be on the order of about 180°.

In constructing pod 68, it is preferable to arrange nozzles 60 and 62 as two groups of nozzles in the manner shown in FIG. 8, wherein a first group shown on the left hand half of the pod swing in a direction opposite to a like second group shown on the right hand half of the pod, in order to maintain reaction forces generated by the nozzles essentially zero as measured in a direction extending lengthwise of the pod. This is achieved by angularly offsetting the inner parts of bearings 54 mounting the first and second groups of nozzles by 180° relative to drive shaft 50.

Figure 12:
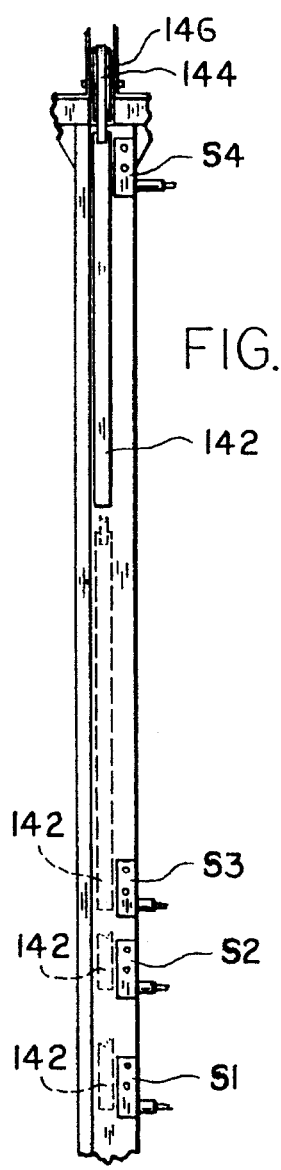
FIG. 12 is a fragmentary view illustrating an arrangement for sensing the vertical position of the pod relative to the housing.

The vertical position of pod 68 may be sensed by suitable means such as magnetic or proximity switches S1, S2, S3 and S4 shown in FIG. 12 as being vertically spaced along the paths of travel of an iron bar 142 whose upper end is connected to journal carrier 90 via a flexible cable or strap 144 trained over a guide pulley 146. The uppermost position of bar 142 shown in full line in FIG. 12 and sensed by switch S4 corresponds to the second limiting position of journal carrier 90, and the lowermost position of the bar shown in broken line in FIG. 12 and sensed by switch S1 corresponds to the first limiting position of the journal carrier. Thus, switches S4 and S1 are employed to sense when pod 68 is in its lowermost use position and its uppermost or storage position, respectively. Switches S2 and S3 sense when pod 68 is arranged at selected intermediate use positions.

Figure 14:
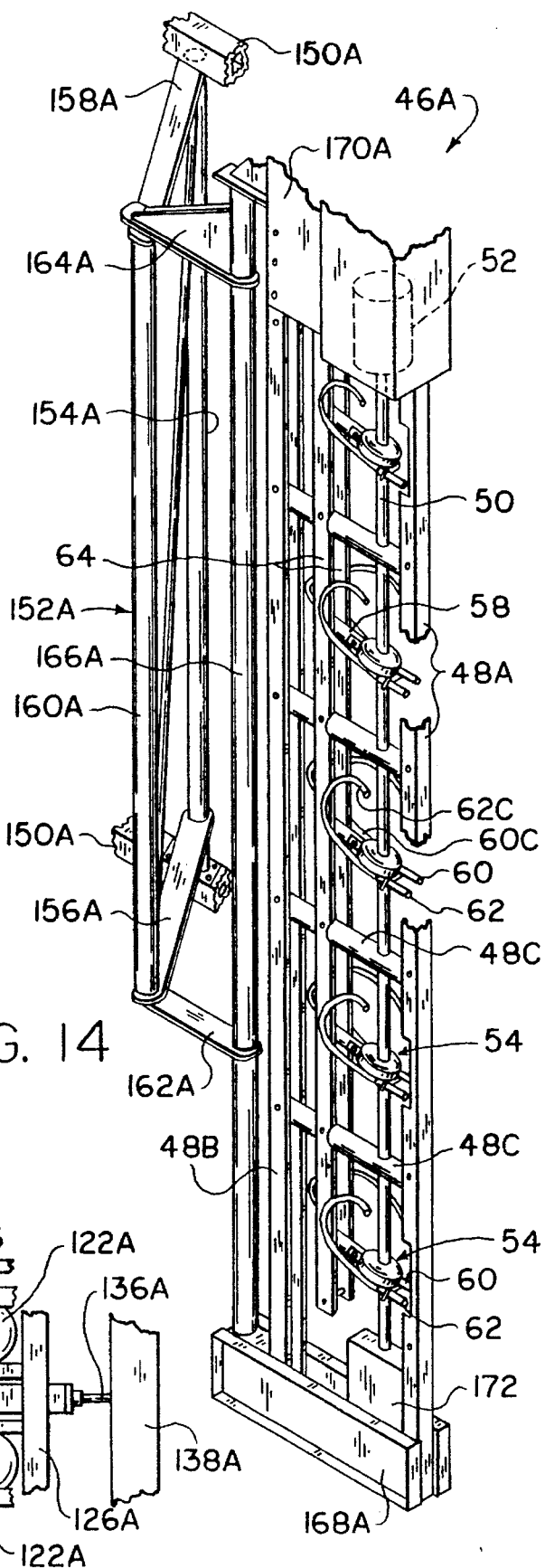
FIG. 14 is a perspective view illustrating the mounting and drive arrangement for a group of pairs of nozzles associated with the left hand leg or side of the housing, as viewed in FIG. 1.

Reference is now made to FIG. 14, wherein the drive and support mechanism of the second means is shown for the case of portion 46A as being mounted on channels 150A of housing left leg portion 40A for horizontal swinging movement by a multiple hinge assembly 152A. Assembly 152A includes a first vertically extending bearing shaft 154A serving to mount a first pair of horizontal struts 156A and 158A for horizontal swinging movement about the axis of the first bearing shaft; a second vertically extending bearing shaft 160A carried by the first pair of struts for mounting a second pair of horizontal struts 162A and 164A for horizontal swinging movement about the axis of the second bearing shaft; and a third vertically extending bearing shaft 166A carried by the second pair of struts for mounting a third pair of struts 168A and 170A for horizontal swinging movement about the axis of the third bearing shaft. Struts 168A and 170A support the lower and upper ends of first and second members 48A and 48B, whereas lower strut 168A additionally serves to support an end bearing 172 for the lower end of drive shaft 50 and upper strut 170A additionally serves to support motor 52. Cleaning solution and rinse water distribution manifolds, not shown, extend vertically along first member 48A for connection with nozzles 60 and 62 via flexible conduits 60C and 62C, respectively. These manifolds are in turn connected to reservoirs 100, 104 and 110 by further conduits, not shown, such that rinse water, cleaning solution and wax are supplied, as required, to nozzles 60 and 62 of first means 44 and second means portions 46A and 46B under like flow rate and pressure conditions.

During normal use, second means portions 46A and 46B are seated within facing chambers, not shown, defined by housing leg portions 40A and 40B, respectively. The facing openings of these chambers are normally closed by vertically elongated panels 176A and 176B, which are fixed to their respective first members 48A, but shown only in FIGS. 7 and 1, respectively. Panels 176A and 176B are provided with pairs of vertically elongated slot openings 178A and 178B arranged for alignment with nozzles 60 and 62 of second means portions 46A and 46B.

Electric motors 52 of second means portions 46A and 46B are connected into relay logic system 106 and cooperate to define a vertical reciprocation drive 180 shown in FIG. 15a.

As indicated in FIGS. 7 and 14, the uppermost ones of cleaning solution nozzles 60 may be eliminated as being unnecessary since it has been found that the endmost ones of nozzles 60 carried by pod 68 will supply a sufficient quantity of cleaning solution to the opposite edges of the top surface of a vehicle being washed.

Nozzles 60 and 62 of second means portions 46A and 46B are arranged to point relatively towards one another and swing in a vertical direction, so as to apply fan-like sprays to opposite sides of a vehicle to be washed. The transverse spacing between facing rinse water nozzles 62, the angle θ and the vertical spacing between vertically adjacent nozzles 62 is chosen to ensure that, when the smallest width vehicle to be washed, such as defined by the typical subcompact, is properly transversely positioned by guide trackway 16, the vertical side surface on each side of the vehicle is sufficiently close to the facing ones of nozzles 62 that a slight vertical overlap occurs between the fan-like spray patterns of vertically adjacent nozzles 62. As the widths of vehicles to be washed increases, the extent of vertical overlap of the spray patterns produced by vertically adjacent nozzles 62 also increases, but without any adverse effect. Inasmuch as cleaning solution and rinse water are preferably supplied to nozzles 60 and 62 of second means portion 46A at the same time as these liquids are supplied to nozzles 60 and 62 of second means portion 46B, means portions 46A and 46B are preferably horizontally aligned where for instance their vertical planes defined by nozzles 60 and 62 are disposed essentially in a coplanar relationship, although precise alignment is not required.

In a like manner, the angle θ and the horizontal spacing between rinse water nozzles 62 of first means 44, as well as the potential vertical use positions of pod 68 to be described, which are above its lowermost use position, are chosen to provide for at least a slight horizontal overlap of the downwardly directed rinse water spray patterns when pod 68 is being moved lengthwise of the vehicle. Similarly, the angle θ, the horizontal spacing between adjacent ones of nozzles 62, and the horizontal distances between such nozzles and the front and rear end surfaces of a vehicle to be washed are considered to provide for horizontal overlap of rinse water spray patterns when directed against front and rear ends of the vehicle.

Preferably, pod 68 is arranged such that when its nozzles 60 and 62 point downwardly, their vertical planes are essentially aligned with vertical planes defined by nozzles 60 and 62 associated with second means portions 46A and 46B.

Now referring to FIG. 7, it will be noted that housing leg portions mount vertically spaced photo cells or other suitable vehicle height sensing devices designated as E1, E2 and E3, and horizontally spaced photo cells or other suitable vehicle front and rear end sensing devices designated as E4 and E5.

Further, reference is made to FIGS. 2 and 7 wherein is shown a preferred arrangement for effecting movement of housing 12 from and for return to its initial position. Specifically, it is contemplated that the pair of wheels 14,14 arranged adjacent to and on opposite sides of the inlet end of housing 12 be driven by an electric motor 184 carried adjacent the upper end of housing leg portion 40B. Motor 184 is connected via a speed reduction transmission 186 and drive belt 188 to a drive shaft 190, which is rotatably mounted to extend through a channel 192 of housing upper portion 40C with its opposite ends positioned within the upper ends of leg portions 40A and 40B. The opposite ends of drive shaft 190 are in turn coupled to the pair of wheels 14,14 to be driven by flexible drive connections, such as belts 194A and 194B, arranged to extend downwardly within housing leg portions 40A and 40B, respectively. As desired, motor 184 may be reversible or transmission 186 controlled to effect rotation of drive shaft 190 in opposite directions and thus rotate the driven wheels in opposite directions as required to move housing 12 from and for return to its initial position.

The mode of travel of pod 68 incident to travel of housing 12 from and for return to its initial position incident to a vehicle washing operation is shown in FIGS. 6a–6d for variously sized and shaped vehicles.

Specifically, FIG. 6a illustrates the mode of travel of pod 68 for the case of a small car C1 having a relatively small overall height, which is such that the top of its roof will not be sensed by any of cells E1, E2 and E3. Accordingly, when C1 has been properly parked relative to housing 12, pad 68 will first be lowered from its initial or uppermost position $P_1$ into its lowermost use position $P_2$, whereupon the pod is rotated from its initial rotatable position, wherein its nozzles are directed downwardly, into its second rotatable position, wherein its nozzles point towards the front end of vehicle C1. Cleaning solution is then supplied to nozzles 60 of pod 68 and directed thereby against the front of vehicle C1, as the pod is lifted into a first upper use position designated as $P_3$. Upon arrival of pod 68 in position $P_3$, it is rotated for return to its initial rotational position wherein nozzles 60 and 62 point downwardly, and as an incident thereto movement of housing 12 is initiated. Movement of housing 12 and thus pod 68 continues until the pod arrives in its position $P_4$, pod 68 is rotated into its third rotational position, wherein its nozzles 68 point towards the rear ends of vehicle C1 and as an incident thereto the pod is lowered in a lowermost position designated as $P_5$. Upon arrival of pod 68 in position $P_5$, flow of cleaning solution to its nozzles 60 is discontinued, and after a short dwell to allow time for the cleaning solution to dissolve dirt, grease, etc. on the surface of the vehicle, flow of rinse water to its nozzles 62 is initiated to direct rinse water against the rear end of vehicle C1 and the pod lifted upwardly into position designated as $P_6$, which correspond to position $P_4$. Upon arrival of pod 68 in its $P_6$ position, the pod is returned to its initial rotational position such that its nozzles 62 point downwardly and travel of housing 12 for return to its initial position is commenced. Upon the return of housing 12 to its initial position, pod 68 is placed into a position designated as $P_7$, which corresponds to position $P_3$. Upon arrival of pod 68 in position $P_7$, it is rotated to assume its second rotational position so that rinse water is directed towards the front of vehicle C1, and as an incident thereto the pod is lowered into its lowermost position $P_8$. Upon the arrival of pod 68 in position $P_8$, flow of rinse water to its nozzles 62 is discontinued, whereafter the pod is lifted for return to its initial $P_1$ position and as an incident thereto the pod is rotated for return to its initial rotational position, wherein its nozzles 60 and 62 point vertically downwardly. As desired, the supply of cleaning solution to nozzles 60 of second means portions 46A and 46B need only occur during actual movement of housing 12 away from its initial position, since during vertical upward movement of pod 68 from position $P_2$ to position $P_3$ and during its downward movement from position $P_4$ to position $P_5$, these nozzles are disposed forward of the front end and rearwardly of the rear end of vehicle C1, and thus cleaning fluid discharged by these nozzles at these times would be wasted. In a like manner, the supply of rinse water to nozzles 62 of second means portions 46A and 46B need only occur as pod 68 is moved from its position $P_6$ into its position $P_7$.

Figure 6B:
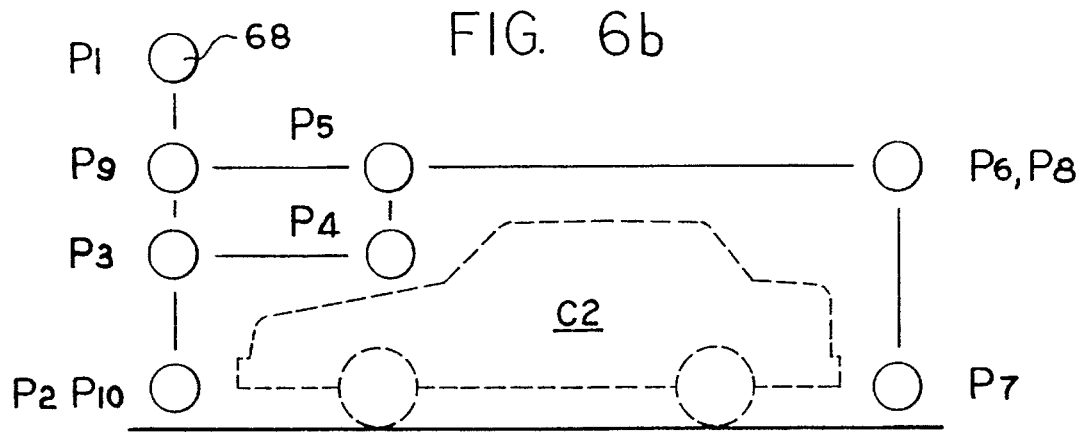
Figure 6C:
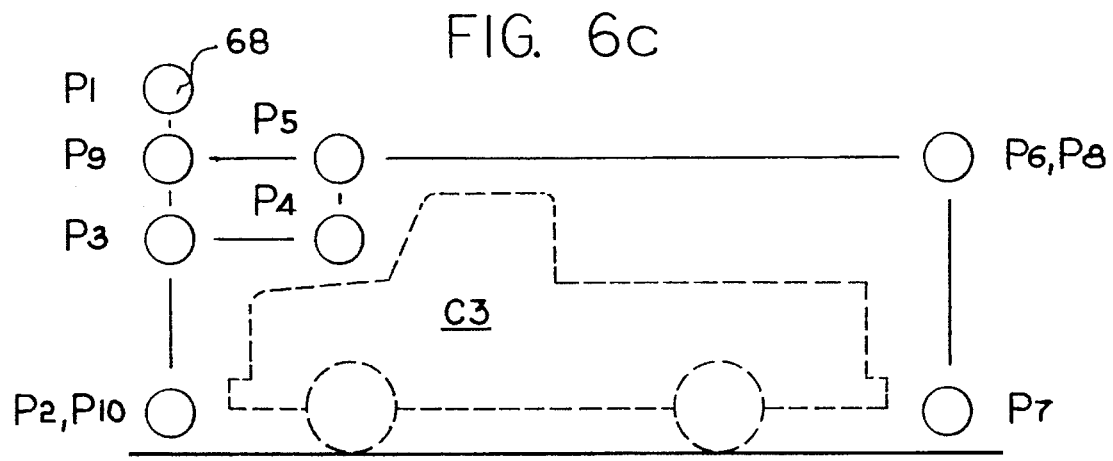
Figure 6D:
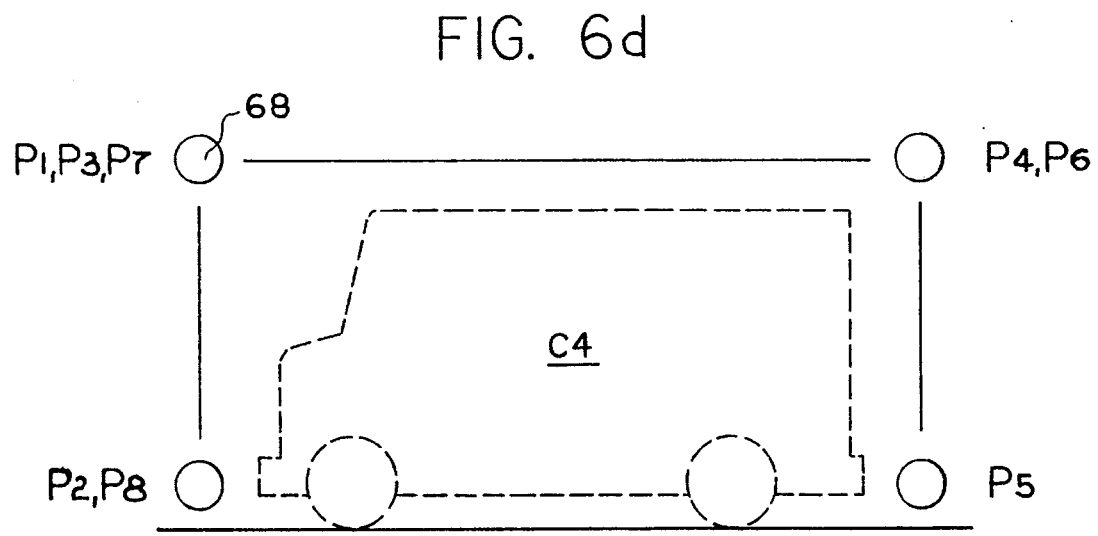

The mode of travel of pod 68 for the case of a maximum size vehicle C4 for which machine 10 is designed, shown in FIG. 6d, for the situation where such vehicle has straight up and down front end or front hood of slight extent. This mode of travel is somewhat similar to that described for the small sized vehicle of FIG. 6a, except that vehicle C4 has a height sufficient to block all of cells E1–E3. As a result, pod 68 must be returned to its uppermost position $P_3$, which corresponds to its initial position $P_1$, prior to initiation of movement of housing away from its initial position, and placed in its position $P_6$, which corresponds in height to that of its positions $P_4$, $P_3$ and $P_1$ prior to return of the housing to its initial position $P_1$. Otherwise, operation is the same as depicted in FIG. 6a.

The mode of travel for pod 68 for the case of vehicles having different heights intermediate those of vehicles C1 and C4 is shown in FIGS. 6b and 6c for the case of a sedan C2 and a large size pickup truck C3, which have front hoods of differing height. Specifically, for the case of vehicle C2, the height of its front end is such that it is not sensed by cells E1–E3 and thus the path followed by pod 68 from its position $P_1$ to position $P_4$ is similar to the path followed by the pod in FIG. 6a from position $P_1$ to position $P_6$, except that after initiation of movement of the housing away from its initial position, the lowermost cell E1 senses an increase in height of vehicle C2 when it becomes blocked by its windshield. Immediately, upon the blockage of cell E1, the pod is lifted into a position $P_5$ and thereafter remains at this new height until the pod arrives in position $P_6$. Before return movement of the housing, pod 68 is lifted to position $P_8$, which corresponds to position $P_6$ and thereafter remains at this height until the pod arrives at position $P_9$ before it is again lowered into its lowermost position $P_{10}$, which corresponds in height to positions $P_2$ and $P_7$. While machine 10 may be adjusted to provide for stepped movement of the pod over the rear trunk of vehicle C2 and for stepped movement of the pod over the front hood of the vehicle upon return of the housing, it is dangerous to do so in view of the mist which continues to build up as the vehicle washing operation proceeds, and such mist sometimes is sufficient to provide false readings by cells E1–E3. Thus, as a safety measure, stepped pod movement is provided only during the initial portion of the vehicle cleaning operation, but it is contemplated that stepped movement of both the front and rear ends of a vehicle may be provided upon the availability of cells less sensitive to false readings. Moreover, it is contemplated that future sensor constructions will allow the pod to more accurately follow the contour of any vehicle presented to machine 10.

The path of travel of pod 68 for the case of vehicle C3 in FIG. 6c is similar to that shown in FIG. 6b, except that the front hood of vehicle C3 is sufficiently high to initially block cell E1 with the result that the height of the pod in its positions $P_3$ and $P_4$ corresponds to that of positions $P_5$, $P_6$, $P_8$ and $P_9$ of the pod shown for vehicle C2 in FIG. 6b. Further, it will be noted that as movement of housing 12 away from its initial position continues, cell E2 becomes blocked by the windshield of vehicle C3 with the result that the pod is lifted into position $P_5$, which is arranged at a height vertically intermediate the heights of positions $P_5$ and $P_1$ of FIG. 6b. If at this point in time cell E3 should also become blocked, then the pod would be raised further into its uppermost position for travel above the roof of vehicle C3, such as previously described with reference to the maximum size vehicle C4.

Figure 15B:
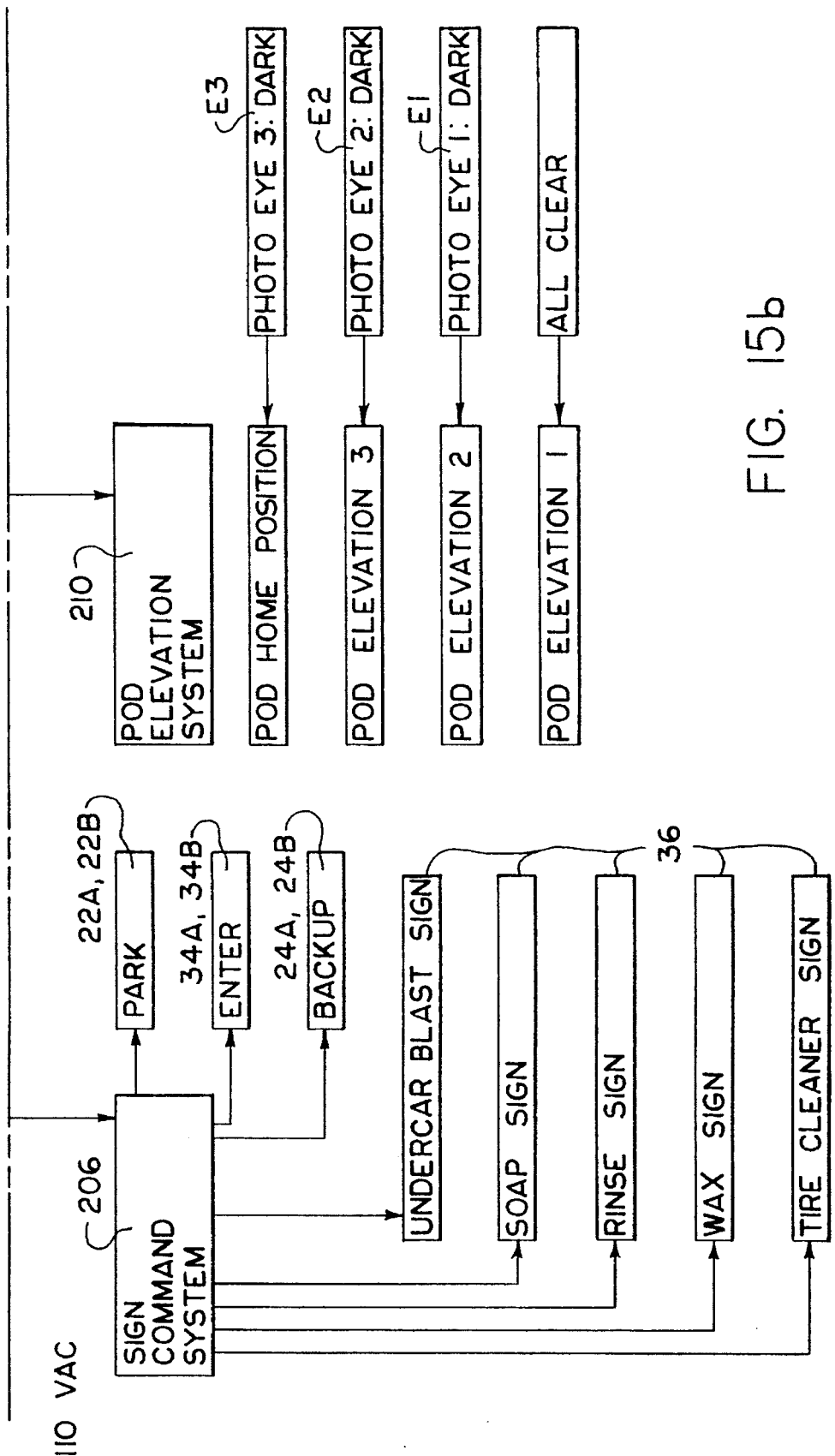

The mode of operation of machine 10 as controlled by relay logic system 106 and will now be described with reference being made primarily to FIGS. 15a and 15b.

Prior to operation of machine 10, housing 12 is located in its initial position shown in FIG. 1 by travel home system 200, responsive to automatic home travel 202 and home proximity switch 204 connected thereto. Operation of machine 10 is initiated by a user, such as a customer driving a vehicle, tendering a predetermined cash amount to bill acceptor 38 and pressing carwash button 38A and, if desired, wax button 38B, upon approaching housing 12.

Sign command system 206 connected to relay logic system 106 causes enter signs 34A, 34B to flash, thereby providing a visual instruction prompting the vehicle driver to drive the vehicle forward for engagement of a right front tire of the vehicle with tire position sensing device 20. Visual indicators 36 representing standard wash cycles, such as soap sign 36 and rinse sign 36, are also connected to sign command system 206. Where one or more optional features are chosen by the customer, for instance wax treatment, visual indicators 36 corresponding to the chosen features are caused to flash by sign command system 206.

A further preliminary operational step is the filling of reservoirs 100, 104, and 110 with their respective liquids via liquid dispensing means 32 connected to relay logic system 106.

As the vehicle is positioned relative to housing 12 by engagement of the right front tire with tire position sensing device 20, switches associated with device 20, not shown, provide for illumination of park signs 22A, 22B where the vehicle is properly positioned, and illumination of backup signs 24A, 24B where the vehicle is positioned too far forward toward housing 12, as is appropriate. Once the vehicle is properly positioned relative to housing 12, it is set to a parked condition for subsequent washing operations.

Hot soap generator 208 turns on to heat up cleaning solution stored in reservoir 104, horizontal reciprocator drive 108 begins functioning, and sign command system 206 turns on soap sign 36. Relay logic system 106 then signals pod elevation system 210 and travel rear system 212 to control the mode of travel and rotational orientation of pod 68, as previously described with reference to FIGS. 6a–6d for variously sized vehicles, during application of cleansing liquid to the vehicle. However, if front end sensing device E4 senses the front end of the parked vehicle, indicating that the vehicle's front end is extraordinarily long, pod elevation system 210 is not activated. At the moment travel rear system 212 initiates movement of housing 12 toward the rear end of the vehicle, vertical reciprocator drives 180 associated with housing leg portions 40A and 40B begin functioning to apply cleaning solution to the vehicle sides; vertical reciprocator drives 180 turn off when rear end sensing device E5 indicates that the rear end of the vehicle has been reached to avoid wasting energy and cleaning solution. If rear proximity switch 214 is tripped before rear end sensing device E5 indicates that the rear end of the vehicle has been reached, it is assumed that a very long vehicle, such as a limousine, is being washed, and the pod elevation system 210 is not activated. Once the application of cleansing solution is completed, soap sign 36 is turned off.

Following a short dwell period or time out of adjustable duration after application of cleaning solution, sign command system 206 turns on rinse sign 36 and high pressure pump starter 118 is signalled to activate high pressure pump 102 for delivering rinse water to the vehicle. If the wax option has been chosen by the customer, wax solenoid 112 is triggered to cause wax to flow into the water entering high pressure pump 102.

The mode of travel of pod 68 for the rinsing cycle of machine 10 is controlled by travel home system 200 and pod elevation system 210 and is as previously described with reference to FIGS. 6a–6d. Travel home system 200 causes housing 12 to move toward its initial position proximate the front end of the vehicle while the rinsing operation takes place. Once home proximity switch 204 is reached, movement of housing 12 is ceased and the vertical reciprocator drives are deactivated. Once pod elevation system 210 causes pod 68 to travel along the front end of the vehicle to rinse same and returns the pod to its uppermost position $P_1$, the washed vehicle is free to exit forwardly through housing 12 and machine 10 shuts off, ready to receive another customer.

If at any time during the vehicle wash cycle the switch associated with tire position sensing device 20 is released, indicating movement of the vehicle, automatic home travel 202 is activated and machine 10 automatically shuts down. This event also occurs if pod 68 is impacted by an object, such as a vehicle, and is knocked out of its track system.

What is claimed is:

1. A mechanism for applying liquid in a fan-like spray pattern to a surface to be cleaned comprising in combination:

at least one liquid discharge nozzle;

a drive shaft having an axis of rotation;

a bearing having inner and outer parts journalled for relative rotation about a bearing axis, said inner part being fixed to said drive-shaft for rotation therewith and to arrange said bearing axis thereof to reside at an angle relative to said axis of rotation, said outer part mounting said at least one nozzle; and means for constraining said outer part against rotation about said axis of rotation of said drive shaft.

2. A mechanism according to claim 1, wherein a plurality of said bearings are carried by said shaft at points spaced lengthwise thereof and each of said bearings mounts a said at least one nozzle, and said means for constraining said outer part constrains said outer part of each of said bearings.

3. A mechanism according to claim 2, wherein said nozzles are zero degree nozzles having the discharges thereof arranged to move adjacent a common plane disposed essentially parallel to said axis of rotation.

4. A mechanism according to claim 3, wherein second nozzles are mounted one on each of said outer parts and have discharges thereof arranged to move adjacent another common plane disposed essentially parallel to said common plane.

5. A mechanism according to claim 2, wherein said means for constraining said outer parts includes a stationary guide extending generally parallel to said drive shaft and a follower carried one by each of said outer parts to project generally radially of said bearing axis thereof, and each said follower has a projecting outer end slidably and rotatably engaged with said guide.

6. A mechanism according to claim 1, wherein a plurality of said bearings are carried by said drive shaft and arranged in two groups of bearings spaced lengthwise of said drive shaft, said bearings each mounting a said at least one nozzle, said bearings of one of said groups being tilted relative to said bearings of another one of said groups to cause said nozzles associated with said one group to swing in a direction opposite to said nozzles associated with said other group for essentially cancelling reaction forces generated by said nozzles in a direction extending lengthwise of said drive shaft.

7. A mechanism according to claim 1, wherein a second nozzle is mounted on said outer part, and said at least one nozzle and said second nozzle are arranged essentially parallel and equidistant from said bearing axis.

8. A mechanism for applying pressurized jets of liquid in fan-like spray patterns to a surface to be cleaned comprising in combination:

a drive shaft having an axis of rotation;

a plurality of bearings spaced apart lengthwise of said shaft and having inner and outer parts journalled for relative rotation about bearing axes, said inner parts being fixed to said drive shaft for rotation therewith about said axis of rotation and to arrange said bearing axes to reside at a like angle relative to said axis of rotation;

a plurality of nozzles for discharging pressurized jets of liquid;

a plurality of nozzle mounting brackets for mounting said nozzles one on each of said outer parts of said bearings, said brackets including followers having ends arranged to project radially of said outer parts; and stationary guide means arranged for engagement with said ends of said followers for constraining said outer parts against rotation with said drive shaft and to position said nozzles to arrange said jets in an essentially parallel relationship.

9. A mechanism according to claim 8, wherein a plurality of cleaning fluid applying nozzles are mounted one on at least certain of said mounting brackets and arranged to lie essentially parallel to said nozzles.

10. A mechanism according to claim 9, wherein a framework is provided in combination for mounting said mechanism, said framework including first and second parallel members and cross members extending transversely between said parallel members, said cross members are formed with aligned openings for rotatably receiving said drive shaft, said bearings are arranged on said drive shaft one intermediate an adjacent pair of said cross members, and said guide means includes a pair of parallel plates fixed to said cross members intermediate said drive shaft and one of said first and second parallel members to extend parallel thereto and having facing surfaces, said nozzles mounted by each of said mounting brackets being arranged to straddle the other of said first and second parallel members, and said ends of the followers being arranged for sliding and rotational engagement with said facing surfaces of said parallel plates.

11. A mechanism for applying pressurized jets of liquid in fan-like spray patterns to a surface to be cleaned comprising in combination:

a drive shaft having an axis of rotation;

a plurality of bearings spaced apart lengthwise of said shaft and having inner and outer parts journalled for relative rotation about bearing axes, said inner parts being fixed to said drive shaft for rotation therewith about said axis of rotation and to arrange said bearing axes to reside in an inclined relationship relative to said axis of rotation;

a plurality of nozzles for discharging pressurized jets of liquid having minimum divergence;

mounting means for mounting said nozzles one on each of said outer parts of said bearings for movement therewith; and constraining means for constraining said outer parts against rotation with said drive shaft about said axis of rotation, and said jets are caused upon rotation of said drive shaft to swing back and forth adjacent common planes disposed essentially parallel to said axis of rotation.

\* \* \* \* \*